United States Patent [19]

Barrus et al.

[11] Patent Number: 4,880,596
[45] Date of Patent: Nov. 14, 1989

[54] THERMIONIC SWITCHED SELF-ACTUATING REACTOR SHUTDOWN SYSTEM

[75] Inventors: Donald M. Barrus; Charles D. Shires, both of San Jose; William A. Brummond, Livermore, all of Calif.

[73] Assignee: The United States of America as represented by the United States Department of Energy, Washington, D.C.

[21] Appl. No.: 120,710

[22] Filed: Nov. 13, 1987

Related U.S. Application Data

[63] Continuation of Ser. No. 270,682, Jun. 4, 1981, abandoned.

[51] Int. Cl.$^4$ .............................................. G21C 7/12
[52] U.S. Cl. .................... 376/336; 376/321; 361/103; 361/161; 313/310; 374/174; 337/306
[58] Field of Search ............ 376/321, 336, 337, 228, 376/233, 230; 361/103, 161; 322/2; 313/310; 310/106, 306; 374/174; 337/306, 327, 120

[56] References Cited

U.S. PATENT DOCUMENTS

| | | |
|---|---|---|
| 2,781,308 | 2/1957 | Creutz et al. |
| 2,867,727 | 1/1959 | Welker et al. |
| 2,885,893 | 5/1959 | Lane et al. |
| 2,904,487 | 9/1959 | Dickson |
| 2,931,763 | 4/1966 | Dever |
| 2,959,713 | 11/1960 | Matthews ............................ 361/103 |
| 2,975,119 | 3/1961 | Emmons |
| 3,035,995 | -5/1962 | Seeley et al. |
| 3,088,901 | 5/1963 | Gustafsson et al. |
| 3,121,048 | 2/1964 | Haas .................................. 376/321 |
| 3,177,124 | 4/1965 | Eggen et al. |
| 3,198,709 | 8/1965 | Macomber |
| 3,215,868 | 11/1965 | Pidd et al. ........................... 376/321 |
| 3,359,172 | 12/1967 | Olsson |
| 3,437,910 | 4/1969 | Haring et al. ........................... 322/2 |
| 3,455,781 | 7/1969 | Leffert ................................. 376/321 |
| 3,940,309 | 2/1976 | Imperiali |
| 3,940,310 | 2/1976 | Irion et al. .......................... 376/230 |
| 3,970,007 | 7/1976 | Klein |
| 4,085,004 | 4/1978 | Fletcher et al. |
| 4,138,320 | 2/1979 | Grantz .............................. 376/230 |
| 4,158,602 | 6/1979 | Minnick |

FOREIGN PATENT DOCUMENTS

| | | |
|---|---|---|
| 1155834 | 10/1963 | Fed. Rep. of Germany ...... 310/106 |
| 857432 | 12/1960 | United Kingdom |
| 888394 | 1/1962 | United Kingdom |
| 897456 | 5/1962 | United Kingdom |

OTHER PUBLICATIONS

"Study of Thermionic Converter Reactor Control Switch", G.E. Co. Summary Report, 6/6/80, Hatch et al., pp. 1-29.
Report XL-895-00453, 9/80, Germer et al., pp. 1-23, (A-2)-(A-10).
Kapl-M-LBV-7, 9/55, Vandenberg, pp. 3-5, 8,10,20-28, 36-38.

Primary Examiner—Harvey E. Behrend
Attorney, Agent, or Firm—L. E. Carnahan; Roger S. Gaither; Judson R. Hightower

[57] ABSTRACT

A self-actuating reactor shutdown system incorporating a thermionic switched electromagnetic latch arrangement which is responsive to reactor neutron flux changes and to reactor coolant temperature changes. The system is self-actuating in that the sensing thermionic device acts directly to release (scram) the control rod (absorber) without reference or signal from the main reactor plant protective and control systems.

To be responsive to both temperature and neutron flux effects, two detectors are used, one responsive to reactor coolant temperatures, and the other responsive to reactor neutron flux increase. The detectors are incorporated into a thermionic diode connected electrically with an electromagnetic mechanism which under normal reactor operating conditions holds the the control rod in its ready position (exterior of the reactor core). Upon reaching either a specified temperature or neutron flux, the thermionic diode functions to short-circuit the electromagnetic mechanism causing same to lose its holding power and release the control rod, which drops into the reactor core region under gravitational force.

22 Claims, 4 Drawing Sheets

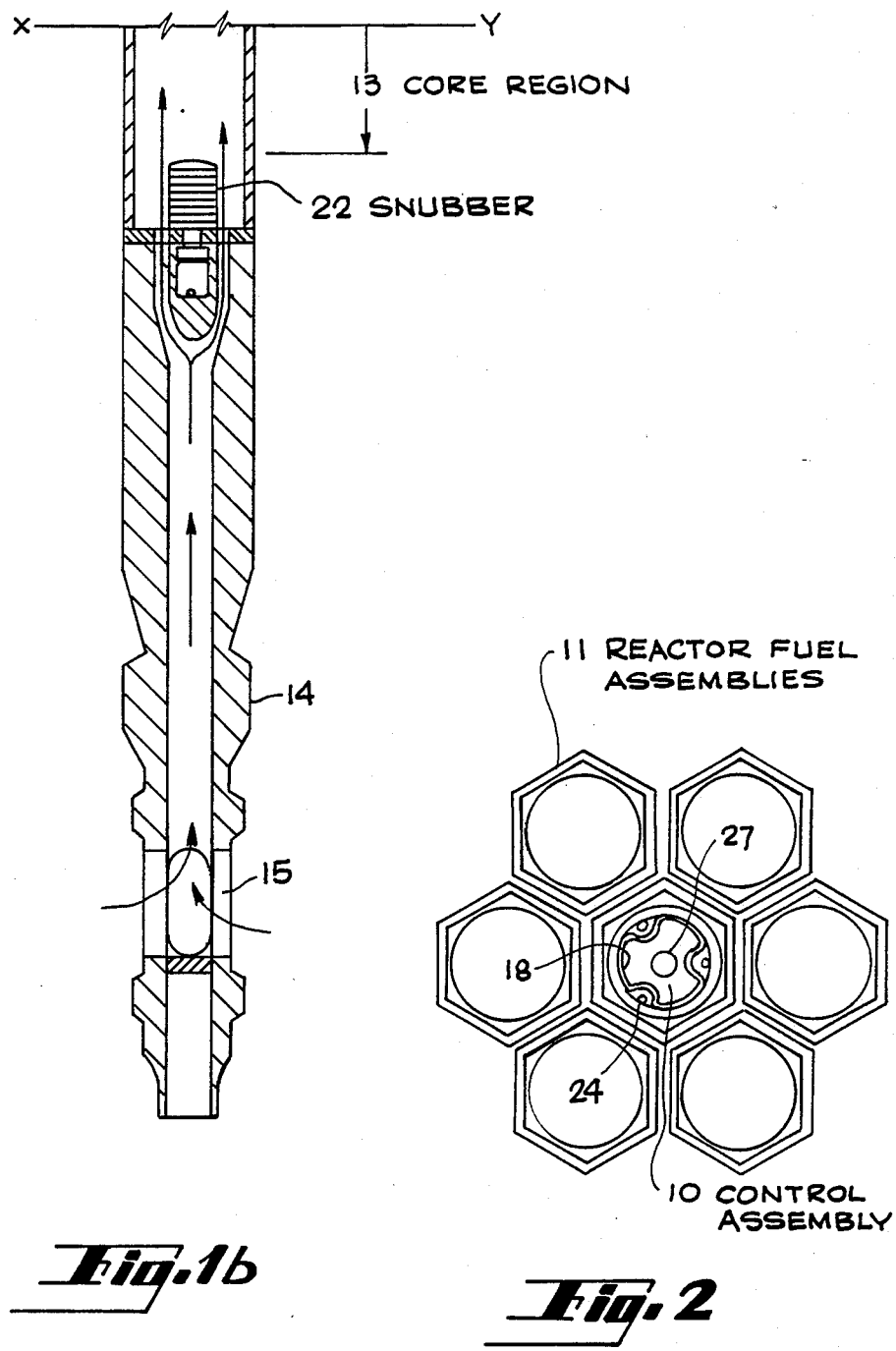

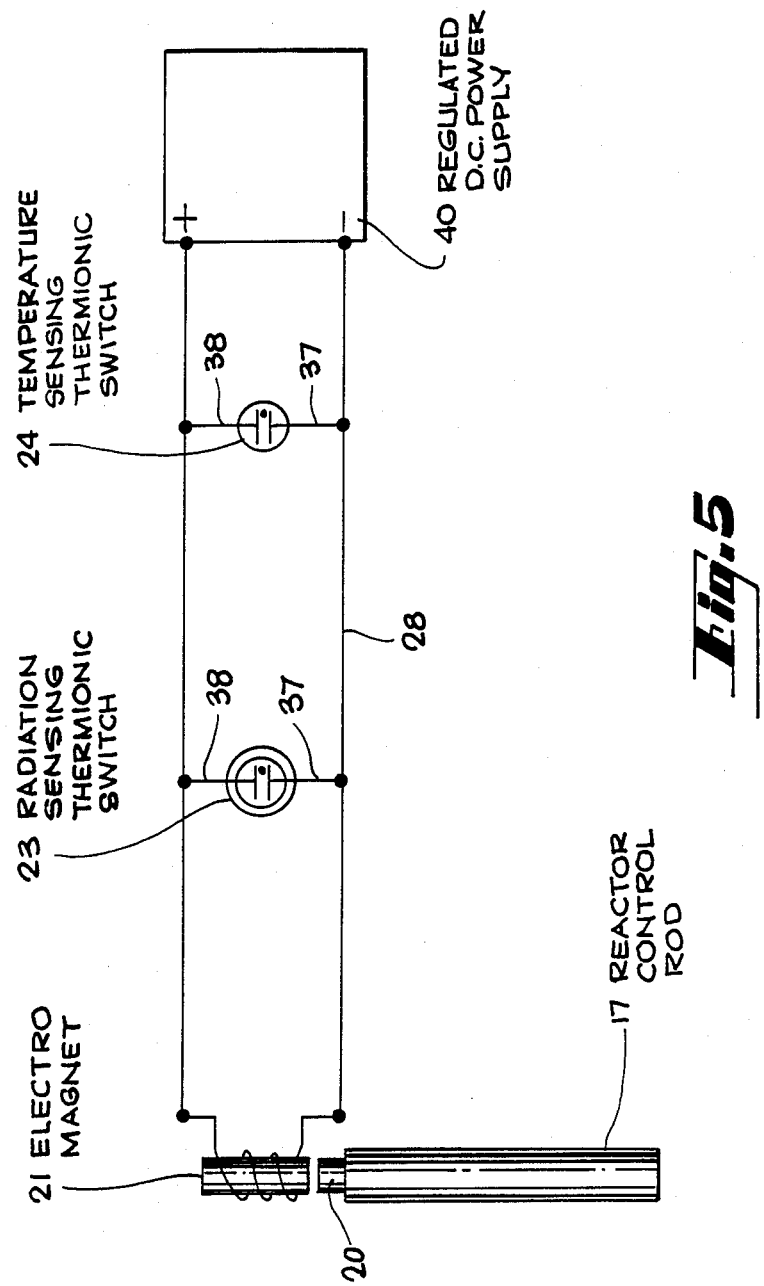

THERMIONIC SWITCHED SELF-ACTUATING REACTOR SHUTDOWN SYSTEM

BACKGROUND OF THE INVENTION

The invention described herein arose under Contract NO. DE-AT03-76SF71032 between the United States Department of Energy and the General Electric Company.

This is a continuation of U.S. application Ser. No. 270,682 filed June 4, 1981, now abandoned.

The invention relates to control systems for nuclear reactors, and, more particularly, to a self-actuated control system responsive to temperature increase or overpower conditions of a reactor.

The use of control systems to regulate the reactivity of a nuclear reactor by varying the location of control (neutron absorber) elements or rods with respect to the reactive core is well known. With a view toward the possibility of an emergency condition arising, as by an unexpected drop in coolant flow, increase in temperature, or rise in reactivity, such control systems include arrangements for "scramming" the control rods, i.e., for rapid insert of the absorber elements into the core to quickly shut down the reactor.

With the advent of the liquid metal fast breeder reactor (LMFBR) and the Gas-Cooled Fast Reactor (GCFR), a need for faster, less complex, more reliable control rod scram or shutdown systems has become apparent, whereby the reactivity of the reactor can be quickly shut down.

More recent efforts have been directed to the desirability of utilizing secondary or alternate control systems of the self-actuating type which would make an LMFBR or GCFR inherently safe. Such alternate or self-actuating systems provide control without reliance on the primary reactor control system or plant operators, while being capable of actuation by the plant operators. These efforts have resulted in systems which sense the reactor flow rate and actuate when the flow drops below a predetermined level, measure the temperature of the coolant and actuate when the temperature exceeds a specified point, or measure the flux or reactivity level of the reactor and actuate when the reactivity exceeds a specified level. The following exemplifies various operator-actuated and/or self-actuated prior art control systems.

U.S. Pat. No. 4,158,602 issued June 19, 1979, to L. E. Minnick discloses a self-actuating scram system triggered by a loss of primary coolant flow which supports the absorber rods above the reactor core region. A loss of primary coolant flow causes a decrease in the supporting pressure on the absorber rods allowing the rods to fall into the core region, thus scramming the reactor.

U.S. Pat. No. 3,359,172 issued Dec. 19, 1967, to C. S. Olsson discloses a reactor shutdown system employing an electromagnet-operated valve to terminate coolant flow. Absorber rods, normally suspended above the core, will fall into the core region upon loss of coolant flow. U.S. Pat. No. 2,931,763 issued Apr. 6, 1960, to J. A. Dever discloses a control apparatus incorporating electromagnetically held control rods. The control rods are released upon a signal initiated within an ionization chamber. Electron tubes conduct sufficient current to retain the control rods as long as the neutron flux remains below a predetermined level.

U.S. Pat. No. 2,781,308 issued Feb. 12, 1957, to E. C. Creutz et al discloses a neutronic reactor control system in which voltage produced by an ionization chamber effects release of absorber rods from an electromagnetic latching mechanism.

U.S. Pat. No. 3,940,309 issued Feb. 24, 1976, to F. Imperiali discloses a self-actuated scram system utilizing electromagnetic means to suspend and release absorber material into the reactor core region.

U.S. Pat. No. 2,867,727 issued Jan. 6, 1959, to H. Welker et al discloses a neutron-sensing device in which neutrons, penetrating a semiconductor, create electron-hole pairs which produce a voltage which can be monitored.

U.S. Pat. No. 4,085,004 issued Apr. 18, 1978, to J. c. Fletcher et al discloses a control device for a nuclear thermionic power source. Actual neutron flux is compared to a linear function of current supplied by a thermionic converter.

U.S. Pat. No. 3,970,007 issued July 20, 1976, to J. R. Klein discloses a neutron detection device utilizing uranium hydride as a neutron sensor. Radiation causes the uranium hydride to fission, releasing heat and hydrogen gas. The gas pressure breaks a normally closed circuit causing activation of a safety device.

U.S. Pat. No. 3,177,124 issued Apr. 6, 1965, to D. T. Eggen et al discloses a reactor control device triggered by the melting of a solder joint. Upon experiencing an increase in neutron flux a layer of uranium abutting the solder joint begins to heat the joint until it melts, releasing absorber material.

U.S. Pat. No. 2,904,487 issued Sept. 15, 1959, to J. J. Dickson discloses a reactor control system employing a temperature responsive transducer actuated by heat generated from a uranium strip. Neutron flux causes the uranium strip to fission and heat a bimetallic transducer which generates an automatic control signal.

Thus, while various approaches have been developed for reactor control, a need still exists for a simple self-actuated control system which is failsafe, reliable, testable in the core at shutdown, resettable and capable of actuating upon sensing either the initiation of a transient coolant temperature increase event or a transient overpower (increased reactivity) event, as well as being capable of actuation by plant operators. The above-cited art fulfills certain of these requirements in various ways, but involves complex apparatus and is not fully responsive to both or either of these reactor conditions by use of simple control apparatus.

RELATED APPLICATION

The present invention is in the same general field of art as U.S. application Ser. No. 270,672, filed June 4, 1981, and assigned to the assignee of this application.

SUMMARY OF THE INVENTION

It is an object of the present invention to provide a self-actuated control system for nuclear reactors.

It is a further object of the invention to provide a self-actuated shutdown system for a reactor which is responsive to coolant temperature increase and/or over-power (increased reactivity) conditions of the reactor.

A further object of the invention is to provide a self-actuating reactor shutdown system, particularly applicable for liquid metal cooled fast breeder reactors (LMFBR) and gas-cooled fast reactors (GCFR).

Another object of the invention is to provide a self-actuated shutdown system for a reactor which utilizes a thermionic switched electromagnetic latch arrangement responsive to reactor neutron flux changes and to reactor coolant temperature changes.

Another object of the invention is to provide a thermionic switched, electromagnetic latched self-actuating reactor shutdown system which utilizes a thermionic diode for actuating the electromagnetic latch for releasing absorber elements into a reactor core.

The self-actuating shutdown system (SASS) of the present invention, which utilizes a thermionic sensing device, acts directly to cause release (scram) of the control rod (absorber element) without a reference or signal from the main reactor plant protection and control systems. The thermionic trigger or switch acts in conjunction with, but independent of, the plant control and protective system and therefore provides separate and redundant reactor shutdown capability for selected off-normal conditions.

To optimize both the temperature and neutron flux effects, the invention utilizes two separate detectors which are tailored to their specialized positions and functions, as follows:

1. Self-actuation in response to a temperature increase of the reactor coolant occurs by heating of a thermionic sensor to a selected set trigger point by the coolant as it emerges from fuel assemblies adjacent to the SASS and impinges on the sensor mounted above the reactor fuel assemblies. As the reactor coolant temperature increases, the temperature of the thermionic sensor is raised to a point where it conducts current (changes from a high impedance to a very low impedance) generating the signal used for shutdown.

2. Self-actuation in response to reactor neutron flux increase is achieved by placing the thermionic sensor near the reactor core or flux region. The thermionic sensor is made responsive to the reactor flux by the attachment of uranium, or other material which heats from neutron bombardment, to its emitter or by enclosing the emitter of the sensor inside a blanket of these materials. When the reactor neutron flux is increased, the uranium or other heating material responds by heating the thermionic sensor to the selected trigger point where it conducts current generating a shutdown signal.

The present invention broadly encompasses a self-actuated reactor shutdown system wherein an electromagnetically actuated latch mechanism retains the control rod (neutron absorber element) in a ready or cocked position exterior of the reactor core region, and upon an increase in coolant temperature beyond a selected point and/or upon an increase in neutron flux (over-power) beyond a selected point, a thermionic device connected electrically to the electromagnetic latch mechanism is heated so as to conduct current which effects a short-circuit of the electromagnet causing same to lose holding power which releases the control rod to drop by gravitational force into the reactor core causing shutdown of the reactor. The thermionic device may, for example, constitute a thermionic diode connected electrically in parallel with the electromagnet.

BRIEF DESCRIPTION OF THE DRAWINGS

FIGS. 1A and 1B illustrate, in partial cross-section, an embodiment of a SASS positioned within a reactor core fuel bundle in accordance with the invention;

FIG. 2 is a view of the FIG. 1 embodiment taken along the lines 2—2 of FIG. 1;

FIG. 5 schematically illustrates an embodiment of an electric circuit interconnecting the electromagnet and the thermionic switch means with an external power supply.

DETAILED DESCRIPTION OF THE INVENTION

The present invention is directed to a self-actuated reactor shutdown system (SASS). While the invention is particularly applicable for use in a liquid metal fast breeder (LMFBR), it can be utilized in other types of reactors, such as the gas-cooled fast reactor (GCFR). A SASS is defined as a control rod system that can scram the reactor automatically without either a signal from an external control circuit or an operator action. Initiation of the scram in accordance with the present invention is entirely from direct sensing of coolant temperature and/or an over-power condition. Particular requirements of a SASS are as follows:

1. It must be capable of operating automatically.
2. It must be fail-safe, such that no malfunction of the SASS can cause a hazardous condition.
3. It must not impose excessive restrictions on normal operation of the reactor.
4. It must have as little as possible adverse effect upon plant availability.
5. It must contribute substantially to the overall safety of the reactor.

The SASS of this invention satisfies each of the above requirements and employs an electromagnetic latch mechanism and a thermionic diode to activate a control rod scram without a signal from the reactor operating control system. The use of electromagnetic latch mechanisms to retain absorber elements such that during normal operation the control rod is held above the reactor core and is dropped into the core upon release of the latch mechanism by gravitational force on the absorber element, are known in the art as pointed out above. While the present invention utilizes this known principal of operation, the invention also incorporates the use of a thermionic device which is responsive to high coolant temperature and/or high neutron flux (over-power) conditions of the reactor. The diode functions to control an electromagnet which, in turn, releases the absorber element, whereby the SASS of this invention provides a system responsive to both coolant temperature and neutron flux.

The SASS incorporating the present invention cannot be overridden by external control either from operators or plant control systems with the intent to hold off a scram. Further, the SASS of this invention is able to be restored to operational or cocked condition only by deliberate operator action, and only when the reactor conditions have been corrected and will permit reactivation. In addition, the SASS of this invention is responsive to scram signals generated by the plant protective systems.

Figure 1A:
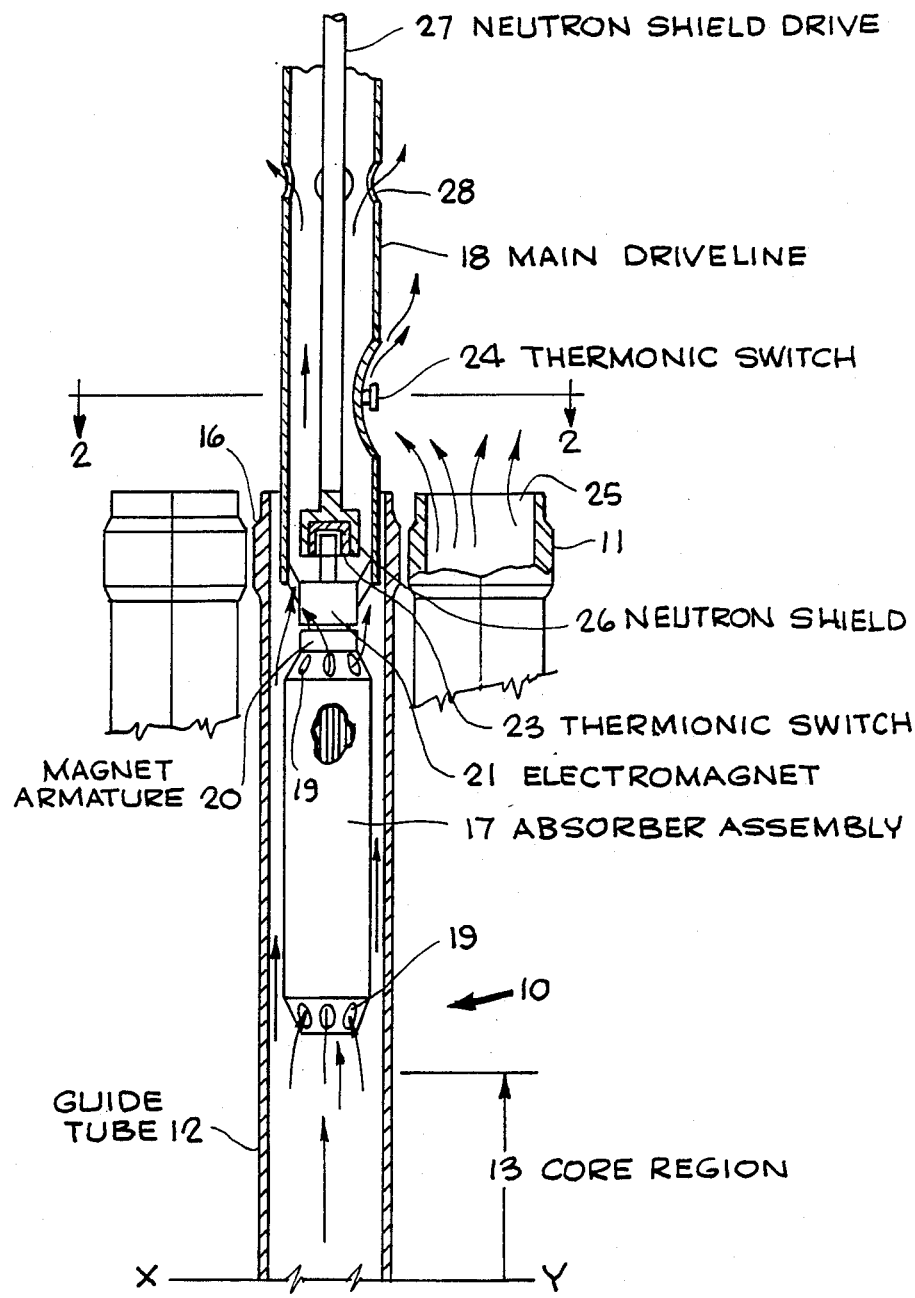

Referring now to FIGS. 1A and 1B, a SASS incorporating the present invention is illustrated. As known in the art and illustrated in the drawings, the control rods or elements of the SASS are positioned within a fuel bundle containing a plurality of fuel rods or assemblies. The fuel bundles are located in the core of the reactor, while the control rod or neutron absorber element of that bundle is maintained in a location exterior of the reactor core region under normal reactor operating conditions. As shown in FIGS. 1A-1B and 2, the SASS or control assembly generally indicated at 10 is positioned centrally within a fuel bundle composed of a plurality of reactor fuel rods or assemblies 11. The control assembly 10 is encased in guide tube 12 which extends through the reactor core region indicated at 13 and secured in the core at the lower end of the guide tube as known in the art. Guide tube 12 is provided at the lower end 14 with a plurality of coolant inlet openings 15 through which reactor coolant under pressure is directed upwardly as indicated by the flow arrows. Movably located within the upper end 16 of guide tube 12 are an absorber assembly (control rod) 17 and a main driveline assembly 18, which are spaced from the inner surface of the guide tube so as to provide for coolant flow therebetween as indicated by flow arrows. Absorber assembly 17, containing neutron absorbing material as known in the art, is provided with a plurality of openings 19 in the lower and upper ends thereof to allow coolant to flow therethrough, as indicated by flow arrows. Secured to the upper end of absorber assembly 17 is a magnet armature 20 which cooperates with an electromagnet 21 secured to the main driveline 18 to retain the absorber assembly in its ready or cocked position exterior of core region 13 as shown, when electromagnet 21 is energized. Positioned in guide tube 12 below the core region 13 is a control assembly snubber or kinetic energy absorbing means 22 which retards the downward movement of the absorber assembly 17 after it passes into the core region.

As pointed out above, the direct holding of a reactor control (absorber) rod by an electromagnet secured to the end of a control drive similar to the apparatus of FIGS. 1A and 1B thus far described is known. In operation of the apparatus thus far described, the electromagnet 21 is lowered by the driveline 18 to contact the magnet armature 20 on the top of the control rod or absorber assembly 17, and the electromagnet 21 is energized by application of electrical current from a power source, whereby the assembly 17 is attracted to the electromagnet and is withdrawn from the core region 13 by driveline 18 and positioned in its ready or cocked location above the core region as shown. Release (scram) of the absorber assembly 17 is obtained by reducing the holding power of the electromagnet 21. For example, such release may be obtained by a known method where the reactor undergoes a thermal transient and the coolant is heated above normal thereby heating the electromagnet to a calibrated curie point, causing the magnet to release the control rod. Release via the curie point approach is effective but slow.

The main driveline 18 is actuated by a mechanically driven system supported on the reactor top shield. A variety of such mechanical drive systems are known, such as electrically driven racks and pinions, roller nut and ball nut screws. The driveline 18 is usually sealed by bellows that allow the linear movement to be translated through the reactor containment boundary.

Figure 4:
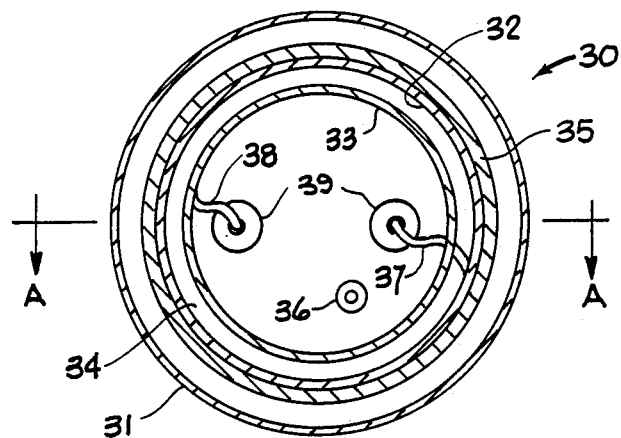
FIG. 4 is a view of the diode taken along the line B—B of FIG. 3.
Figure 3:
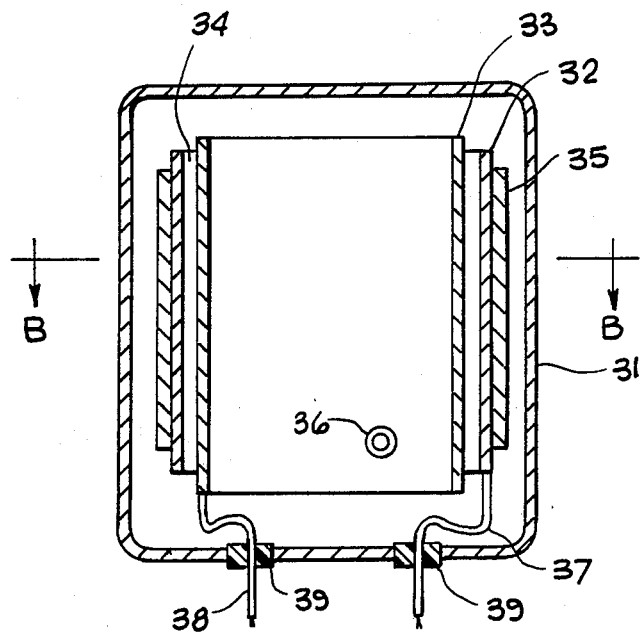
FIG. 3 is a cross-sectional view of an embodiment of a thermionic diode in accordance with the invention taken along the line A—A of FIG. 4.

Release of the absorber element 17 in accordance with the present invention provides a substantially higher speed of response and involves a thermionic device such as one or more thermionic diodes illustrated in FIGS. 3 and 4. The thermionic device is attached electrically in parallel with the electromagnet and when the device conducts it shorts the electromagnet current causing it to lose its holding power.

The thermionic switched electromagnetic latch of the present invention as illustrated in FIGS. 1A and 1B consists of a flux sensing thermionic switch 23 located above and electrically connected in parallel, as described hereinafter, with the electromagnet 21 and a temperature sensing thermionic switch 24 mounted on main driveline 18 above the top guide tube 18. Note that FIG. 2 illustrates three switches 24 positioned around driveline 18. Thermionic switch 24 is also connected electrically in parallel, as hereinafter described, with electromagnet 21 and is located above the coolant outlet 25 of the fuel assemblies 11 so that heated coolant indicated by the flow arrows passing through coolant outlet 25 is directed onto temperature sensing switch 24. A neutron shield 26 for flux sensing thermionic switch 23 is positioned about the switch by a neutron shield drive rod 27 operatively connected to the drive mechanism, not shown, for operating the main driveline 18 described above. Neutron shield 26, for example, may be constructed of material such as depleted uranium. Main driveline 18 is provided with a plurality of coolant outlets 28 such that coolant from inlet 15 passes under pressure up through guide tube 12, through openings 19 and around absorber assembly 17, around electromagnet 21, around thermionic switch 23, upwardly through main driveline 18, and exits via coolant outlets 28.

The flux sensing thermionic switch 23, which can be electrically identical to temperature sensing switch 24, is located within the control assembly 10 so that it will not be in direct contact with high temperature coolant from the fuel assemblies 11.

As shown in FIG. 2, a plurality of temperature sensing thermionic switches 24 can be placed around or along the driveline 18, or the switches 24 can be supported on extensions or arms over the fuel assembly coolant outlets 25. Also, ducts may be provided to direct the coolant flow from outlets 25 onto the temperature sensing thermionic switch 24.

It is within the scope of this invention to utilize a plurality of flux sensing thermionic switches 23 within the control assembly 11 to provide for redundancy, set point, and position adjustment. Also, the flux sensing thermionic switch 23 can be placed in a different location than that illustrated, if needed, to more accurately adjust the detection ability.

The thermionic switches 23 and 24 of FIGS. 1A and 1B control assembly are embodied in FIGS. 3 and 4 as a thermionic diode indicated generally at 30. The diode 30 consists of a sealed container 31 having therein an emitter 32 and a collector plate 33 separated by a gap 34, with a uranium blanket 35 positioned around emitter 32 which causes heating of the diode due to neutron flux, and a quantity of thermionic material 36 located within sealed container 31. Emitter 32 and collector plate 33 are connected to an electrical potential, as illustrated in FIG. 5, via electrical leads 37 and 38, respectively, which extend through insulators 39 in container 31. The uranium blanket 35 may be replaced by a quantity of uranium attached to the emitter 32.

By way of example, the diode 30 may be constructed of the following material: container 31 is of stainless steel; emitter 32 is of molybdenum, with a diameter of 0.750 in. and wall thickness of 0.050 in.; collector plate 33 is of molybdenum, with a diameter of 0.450 in. and wall thickness of 0.10 in.; gap 34 is in the range of 0.10 in.; uranium blanket 35 has a wall thickness of 0.10 in.;

thermionic material 36 may be cesium or other metalic vapors at operational temperatures. The electric leads 37 and 38 are of copper; and the insulators 39 are of alumina.

The thermionic material 36 is tailored to ionize at a selected temperature, for example, in the range of 1000° F. to 1100° F. An electrical potential, from power supply 40, such as 10 to 15 volts, is applied to the emitter 32 and collector plate 33 and when the ionization temperature of the thermionic material 36 is reached, due to reactor over-power conditions (high neutron flux) or coolant temperature, the material changes from high resistance to low resistance thereby conducting more of the available current and, in effect, short-circuits the electromagnet 21 in FIG. 1A which is connected in parallel with the diode 30, via the control circuit illustrated in FIG. 5.

FIG. 5 schematically illustrates an embodiment of an electric circuit interconnecting the electromagnet and the thermionic switch means with an external power supply. As shown, the thermionic switches or diodes 23 and 24 are connected in parallel with electromagnet 21 and to current limited, regulated D.C. power supply 40.

It has thus been shown that the present invention provides a self-actuating shutdown system (SASS) for nuclear reactors, particularly and LMFR, which is responsive to low coolant flow and/or high neutron flux (over-power) conditions of the reactor. The SASS of this invention satisfies each of the requirements outlined above for such a system.

While a particular embodiment of the invention has been illustrated and described, modifications will become apparent to those skilled in the art, and it is intended to cover in the appended claims all such modifications as come with the scope of the invention.

What is claimed is:

1. In a reactor control assembly utilizing electromagnetic means for retaining a control element in ready position for insertion into a reactor core containing a plurality of fuel assemblies having coolant flowing therethrough, the improvement comprising:
   first means responsive to temperature of reactor coolant passing through said fuel assemblies for releasing said control element, said first means including a quantity of thermionic material which changes from a high electrical resistance to a low electrical resistance upon an increase in reactor coolant temperature above a selected temperature;
   second means responsive to reactor neutron flux for releasing said control element, said second means including a quantity of material which is heated by neutron flux and a quantity of thermionic material that changes from a high electrical resistance to a low electrical resistance upon an increase in temperature above a selected temperature, said thermionic material being heated by the heating of said first-mentioned material by neutron flux; and
   an electrical circuit interconnecting a power source with said electromagnetic means, said first and second means being connected to said electrical circuit so as to be electrically in parallel with said electromagnetic means;
   whereby under normal operating conditions electrical current flows from said power source to said electromagnetic means, and activation of either of said first means or said second means causes electrical current flowing to said electromagnetic means to be short-circuited resulting in release of said control element from said electromagnetic means for insertion of said control element into said reactor core.

2. The improvement of claim 1, wherein said first means is positioned such that reactor coolant exiting from the fuel assemblies flows thereacross.

3. The improvement of claim 1, wherein said second means is positioned such that it is shielded from reactor coolant exiting from the fuel assemblies.

4. The improvement of claim 1, wherein each of said first and second means consists of at least one thermionic diode.

5. The improvement of claim 4, wherein at least one of said thermionic diodes constituting said first means is provided with a quantity of uranium comprising said first-mentioned quantity of material which is heated by neutron flux causing heating of said thermionic material and activation of the diode to short circuit electrical current flowing to said electromagnetic means.

6. The improvement of claim 4, wherein each of said thermionic diodes includes an emitter, a collector positioned with respect to said emitter to define a gap therebetween, said emitter and collector being mounted within a sealed container and provided with electrical leads extending therefrom through said sealed container for operative connection to said electrical circuit of said electromagnetic means, and said quantity of thermionic material being located within said sealed container, whereby heating of said thermionic material causes the diode to change from high electrical resistance to low electrical resistance whereupon the diode conducts electrical current causing short circuiting of the electromagnetic means and release of said control element.

7. A self-actuating shutdown system for a nuclear reactor having at least one fuel bundle positioned in a core region and provided with a control assembly and a plurality of fuel assemblies,
   said control assembly having a guide tube within which is movably positioned an absorber element and a drive mechanism for positioning and retaining said absorber element exterior of the core region under normal reactor operating conditions,
   said drive mechanism including an electromagnetic means for retaining said absorber element,
   said absorber element, said guide tube, and said drive mechanism each being constructed so as to allow reactor coolant to pass therethrough,
   a first means responsive to reactor neutron flux,
   a second means responsive to coolant temperature exiting from said fuel assemblies,
   each of said first and second means being operatively connected to an electrical circuit connecting a power source to said electromagnetic means so as to be connected in parallel with said electromagnetic means for causing release of said absorber element upon activation of said first or second means,
   each of said first and second means containing a quantity of thermionic material which ionizes at a selected temperature causing said means to change from a high electrical resistance to a low electrical resistance, and
   said first means additionally including a quantity of material which is heated by reactor neutron flux causing heating of said thermionic material;
   whereby activation of said means, due to heating thereof to said selected temperature by either reactor neutron flux or coolant from the fuel assemblies, causes short-circuiting of said electromagnetic means so as to release said absorber element which falls into the reactor core region for reducing reactivity of the fuel assemblies.

8. The system of claim 7, additionally including kinetic energy absorbing means positioned in said guide tube for stopping movement of said absorber element after it has entered the core region.

9. The system of claim 7, wherein said first and second means comprises a plurality of thermionic switches, at least one of said plurality of thermionic switches being responsive to coolant temperature of the fuel assemblies, and at least one of said plurality of thermionic switches being responsive to reactor neutron flux.

10. The system of claim 9, wherein at least one of said plurality of thermionic switches responsive to reactor neutron flux includes a quantity of uranium constituting said quantity of material for heating said thermionic material and activating said switch.

11. The system of claim 9, wherein said temperature responsive thermionic switch is positioned so as to be in direct contact with coolant exiting from said fuel assemblies.

12. The system of claim 9, wherein said neutron flux responsive switch is positioned so as to be substantially isolated from coolant exiting from said fuel assemblies.

13. The system of claim 12, additionally including neutron shield means positioned adjacent said neutron flux responsive switch.

14. The system of claim 9, wherein each of said thermionic switches are constructed as a thermionic diode having a spaced apart emitter and collector located within a sealed container, said quantity of thermionic material located within said sealed container, and electrical leads operatively connected to said emitter and collector plate and extending through said sealed container for electrical connection to said electrical circuit of said electromagnetic means.

15. The system of claim 14, wherein at least one of said thermionic diodes is additionally provided with a quantity of uranium attached to said emitter.

16. The system of claim 15, wherein said quantity of uranium consists of a uranium blanket positioned around said emitter.

17. The system of claim 9, wherein said temperature responsive thermionic switch is located on an exterior surface of said drive mechanism adjacent the exit of coolant from said fuel assemblies.

18. In a self-actuating reactor shutdown system including at least one control element located within a guide tube, a plurality of reactor fuel assemblies having coolant passing therethrough and positioned around the guide tube and the control element, and electromagnetic means for retaining the control element external to a reactor core region and for releasing said control element so as to enable same to enter into the reactor core region, the improvement comprising:

said guide tube and said control element each being constructed to allow reactor coolant to flow upwardly therethrough, said control element being provided with a magnetic armature at an upper end thereof, an electromagnet located within said guide tube, secured to a drive mechanism, and positioned so as to cooperate with said magnetic armature to retain or release said armature and said control element, and means responsive either to an increase in temperature of the coolant passing through at least one of said fuel assemblies, or to an increase in neutron flux for effecting deactivation of said electromagnet and release of said control element, said means comprising a plurality of switches connected to an electrical circuit connecting an electrical source to said electromagnet so as to be in parallel with said electromagnet and activated by ionization of a quantity of thermionic material contained therein, causing said switches to change from a high resistance to a low resistance thereby short-circuiting current flow through said electrical circuit to said electromagnet, said thermionic material being ionized by an increase in temperature above a selected temperature, one of said plurality of switches being additionally provided with a quantity of material capable of being heated by neutron flux which heats said thermionic material causing ionization thereof.

19. The improvement of claim 18, wherein said plurality of switches include one switch responsive to neutron flux and a plurality of switches response to temperature of the coolant passing through a plurality of said fuel assemblies.

20. The improvement of claim 18, additionally including neutron shield means positioned adjacent said neutron flux responsive switch.

21. The improvement of claim 18, wherein each of said switches is constructed to include a spaced apart emitter and collector located within a sealed container, said quantity of thermionic material being located within said sealed container, and electrical leads extending through said sealed container and operatively connecting each of said emitter and collector to said electrical circuit.

22. The improvement of claim 21, wherein one of said switches additionally includes a quantity of uranium within said sealed container said uranium constituting said material capable of being heated by neutron flux.

* * * * *